US012774793B2

(12) United States Patent

Muegge et al.

(10) Patent No.: US 12,774,793 B2

(45) Date of Patent: Oct. 27, 2026

(54) LIGHTING DEVICE FOR A MOTOR VEHICLE

(71) Applicant: HELLA GmbH & Co. KGaA, Lippstadt (DE)

(72) Inventors: Martin Muegge, Geseke (DE); Thomas Rettweiler, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 244 days.

(21) Appl. No.: 18/201,560

(22) Filed: May 24, 2023

(65) Prior Publication Data

US 2023/0408054 A1 Dec. 21, 2023

(30) Foreign Application Priority Data

May 24, 2022 (DE) ..................... 10 2022 113 052.5

(51) Int. Cl.
*F21S 41/24* (2018.01)

(52) U.S. Cl.
CPC .................................... *F21S 41/24* (2018.01)

(58) Field of Classification Search
CPC ......... F21S 41/24; F21S 43/239; F21S 43/249
See application file for complete search history.

(56) References Cited

U.S. PATENT DOCUMENTS 5,933,084 A 8/1999 Ravier et al.
6,955,459 B2 * 10/2005 Mochizuki ............ F21S 43/237 362/540
7,206,491 B2 * 4/2007 Feng .................... G02B 6/0038 385/901
8,858,025 B2 * 10/2014 Park ...................... F21S 41/192 362/625
10,281,106 B2 * 5/2019 Svettini ................. F21S 43/239
(Continued)

FOREIGN PATENT DOCUMENTS

DE 20318023 U1 3/2004
DE 102016118717 A1 4/2018
(Continued)

OTHER PUBLICATIONS

"Lenticular Lens", Jun. 2020, Wikipedia, https://en.wikipedia.org/w/index.php?title=Lenticular_lens&oldid=961457912 (Year: 2020).*
(Continued)

*Primary Examiner* — Matthew J. Peerce
(74) *Attorney, Agent, or Firm* — Muncy, Geissler, Olds & Lowe, P.C.

(57) ABSTRACT

A lighting device for a motor vehicle, having at least one light source, a planar light guide with an input surface and at least one output surface. The input surface is formed in particular as a front surface of the light guide. The lighting device is set up so that the light generated by the at least one light source enters the light guide at least partially through the input surface so that the light entering through the input surface exits at least partially from the at least one output surface and so that the light merging from the at least one output surface of the light guide passes at least partially through the at least one optical panel. At least one texturing is arranged on the at least one output surface of the light guide and/or the at least one optical panel.

13 Claims, 9 Drawing Sheets

(56) References Cited

U.S. PATENT DOCUMENTS

| | | | | |
|---|---|---|---|---|
| 11,052,816 | B2 | 7/2021 | Muegge | |
| 2016/0116666 | A1* | 4/2016 | Sato | B60Q 1/0058 362/509 |
| 2022/0299187 | A1 | 9/2022 | Muegge et al. | |

FOREIGN PATENT DOCUMENTS

| | | | |
|---|---|---|---|
| DE | 202018106219 | U1 | 11/2018 |
| DE | 102019133693 | A1 | 6/2021 |

OTHER PUBLICATIONS

Photonics Marketplace, "lenticular", Aug. 6, 2020, https://www.photonics.com/EDU/lenticular/d5111 (Year: 2020).*
Merriam-Webster's Collegiate Dictionary 912 (12th ed. 2026).*

* cited by examiner

LIGHTING DEVICE FOR A MOTOR VEHICLE

This nonprovisional application claims priority under 35 U.S.C. § 119(a) to German Patent Application No. 10 2022 113 052.5, which was filed in Germany on May 24, 2022, and which is herein incorporated by reference.

BACKGROUND OF THE INVENTION

Field of the Invention

The present invention relates to a lighting device for a motor vehicle.

Description of the Background Art

The design has long been a determining factor for the signal functions of a motor vehicle, such as, for example, a taillight, a brake light, a direction indicator, or a daytime running light, in rear lamps or in headlights. The design of these lighting devices has become even more significant since the introduction of LED technology, because the small light-emitting diodes, which are often used in larger numbers, can be used much more flexibly than a large incandescent lamp as the illuminant of a signal function, so that a wide variety of design options present themselves in conjunction with the chosen optical system.

A variation of LED technology can be found in the form of OLED technology, in which the illuminant is not small in the form of dots like a light-emitting diode but is designed rather flat and larger in size to form a desired illuminated area that can be illuminated very homogeneously. A disadvantage of OLED technology is the significantly higher cost of OLED technology compared to LED technology. The reasons for these high costs are a complex manufacturing process, the different shapes dictated in each case by the design, and low quantities. In addition, there are special, high requirements in the automotive sector, such as, for example, resistance to UV exposure and forces such as vibrations, shocks, and shaking, as well as temperature resistance in a range between −40° C. to +85° C. or +100° C. These requirements are much more difficult to meet for an organic light-emitting diode than for standard light-emitting diodes.

This leads to a search for alternative possibilities to realize a similar design as with organic light-emitting diodes (OLED), in particular therefore a homogeneously illuminated surface. This is achieved by using light-emitting diodes (LEDs) with a planar light guide and upstream optics, in the form of microstructured films or thin optical panels, to scatter the light emitted from the light guide. Overall, this provides a flat light module which offers high performance with homogeneous illumination of the entire surface as well as any shape and size.

Just as with organic light-emitting diodes, a number of flat light modules can then be positioned offset next to and behind each other when integrated into a rear light to create the desired individual appearance of the signal function, for example, the taillight or the tail brake light.

The general trend in headlights and rear lights is one of continuous downsizing, especially height reduction. This results in more line-shaped light signatures, especially for the taillight, which extend in part as a light line across the entire width of the vehicle. Because there is also a simultaneous requirement for a shallow mounting depth of the lighting device, especially for a trunk lid light, lighting systems are needed that can meet both requirements.

A lighting device of the aforementioned type is known from DE 10 2019 133 693 A1, which corresponds to US 2022/0299187, which is incorporated herein by reference. The lighting device described therein comprises a light source whose light can be coupled into an end face of a planar light guide. The light guide has an output surface from which the light can be coupled out. An optical panel with a texturing is arranged in front of the output surface, wherein the light exiting the output surface passes through the optical panel.

A disadvantage of a conventional lighting device is that the texturing on the optical panel is complex. The texturing includes a large number of microstructure elements, which are designed in particular as truncated cones. These microstructure elements can only be produced by a very complex process in which templates of the microstructure elements are produced by a lithographic process and transferred to an injection molding tool by an electroplating process. The injection molding tool can then be used to produce the optical panel by injection molding. This results in a considerable expenditure of time and money, especially also in the event of repair of a tool.

SUMMARY OF THE INVENTION

It is therefore an object of the present invention to provide a lighting device of the aforementioned type which can be produced more simply and more cost-effectively.

According to an exemplary embodiment, it is provided that the at least one texturing has strip-shaped structures parallel to one another. The strip-shaped structures can be very easily introduced into any surface, especially curved surfaces as well, using known methods such as, for example, cutting or butting. The texturing then provides a light performance and light distribution for a desired signal function in interaction with the optical components, wherein signal functions with high light value requirements, such as a daytime running light or a front direction indicator or also rear functions such as a taillight, a brake light, and a rear direction indicator, can also be realized.

It can be provided that the strip-shaped structures have a center-to-center distance between adjacent structures to one another of between 0.05 mm to 0.5 mm, in particular between 0.05 mm and 0.15 mm. As a result, the microstructure optics formed by the structures can generally no longer be resolved as a structure when viewed with the human eye, so that the output surface of the lighting device, in particular the optical panel, appears substantially diffusely and homogeneously illuminated.

It is possible that the lighting device is set up so that the strip-shaped structures are oriented horizontally and/or vertically when installed in a motor vehicle. The light passing through the structures is scattered by horizontally oriented structures in the vertical direction and by vertically oriented structures in the horizontal direction.

It can be provided that the light guide has a first output surface and a second output surface which are opposite one another. As a result, the light can exit the light guide not only forward toward the at least one optical panel, but also rearward.

It is possible that the lighting device comprises a housing in which the light guide and the at least one optical panel are disposed. In this regard, the housing can have an at least partially reflective rear wall arranged on the light guide side facing away from the at least one optical panel, wherein the lighting device is set up so that light emerging from the second output surface of the light guide strikes the rear wall, is reflected back by it to the second output surface, and at least partially re-enters the light guide through the second output surface before emerging from the first output surface and passing through the at least one optical panel. In particular, the rear wall of the housing can have a texturing with strip-shaped structures. As a result, the rear wall of the housing can contribute to the scattering and homogenization of the light.

It can be provided that the lighting device comprises at least one first texturing and at least one second texturing on the at least one output surface of the light guide and/or the at least one optical panel and/or the rear wall of the housing, in particular wherein the strip-shaped structures of the first texturing are oriented perpendicular to the strip-shaped structures of the second texturing. This ensures that the light is scattered and homogenized in two mutually perpendicular directions, in particular in the horizontal and vertical directions.

It is possible that a texturing with strip-shaped structures is formed on the first output surface of the light guide and/or that a texturing with strip-shaped structures is formed on the second output surface of the light guide, in particular wherein the strip-shaped structures on the first output surface are oriented perpendicular to the strip-shaped structures on the second output surface. Thus, the light guide alone can cause scattering and homogenization of the light in two mutually perpendicular directions.

It can be provided that the thickness of the light guide in the direction perpendicular to the at least one output surface is 1 mm to 3 mm, in particular 1 mm to 2 mm, preferably wherein the thickness of the light guide changes over the longitudinal extent of the light guide, in particular wherein the thickness of the light guide decreases starting from the input surface, for example, from 2.5 mm at the input surface to 1.0 mm at the light guide side opposite to the input surface. A flat design of the lighting device can be achieved due to the very low thickness of the light guide. Due to the decreasing thickness of the light guide, an appearance similar to that of a thin organic light-emitting diode (OLED) can be achieved. In particular, in this regard, the texturing and the change in thickness of the light guide over the length of the light guide can correlate with one another to generate a homogeneous illumination of the output surface.

It is possible that the at least one optical panel has an input surface and an output surface, opposite to the input surface, for the light emerging from the light guide. It can be provided here that a texturing with strip-shaped structures is formed on the input surface of the at least one optical panel and/or that a texturing with strip-shaped structures is formed on the output surface of the at least one optical panel, in particular wherein the strip-shaped structures on the input surface are oriented perpendicular to the strip-shaped structures on the output surface. Thus, the optical panel alone can also cause scattering and homogenization of the light in two mutually perpendicular directions.

It is possible that the lighting device comprises a first and second optical panel arranged in the lighting device so that, during operation of the lighting device, light emerging from the at least one output surface of the light guide passes at least partially sequentially through the first optical panel and the second optical panel. Both the first optical panel and the second optical panel can have a texturing with strip-like structures on their input surface and/or on their output surface. The optional second optical panel can likewise contribute to the diffusivity and homogenization of the light emerging from the lighting device. Furthermore, the second, outer optical panel can, under certain circumstances, conceal strip-shaped structures on the first optical panel for an observer.

It can be provided that the thickness of the at least one optical panel between the input surface and the output surface is less than or equal to 1.5 mm, in particular less than or equal to 1.0 mm. The very thin thickness of the at least one optical panel can also contribute to a flat design of the lighting device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 6:
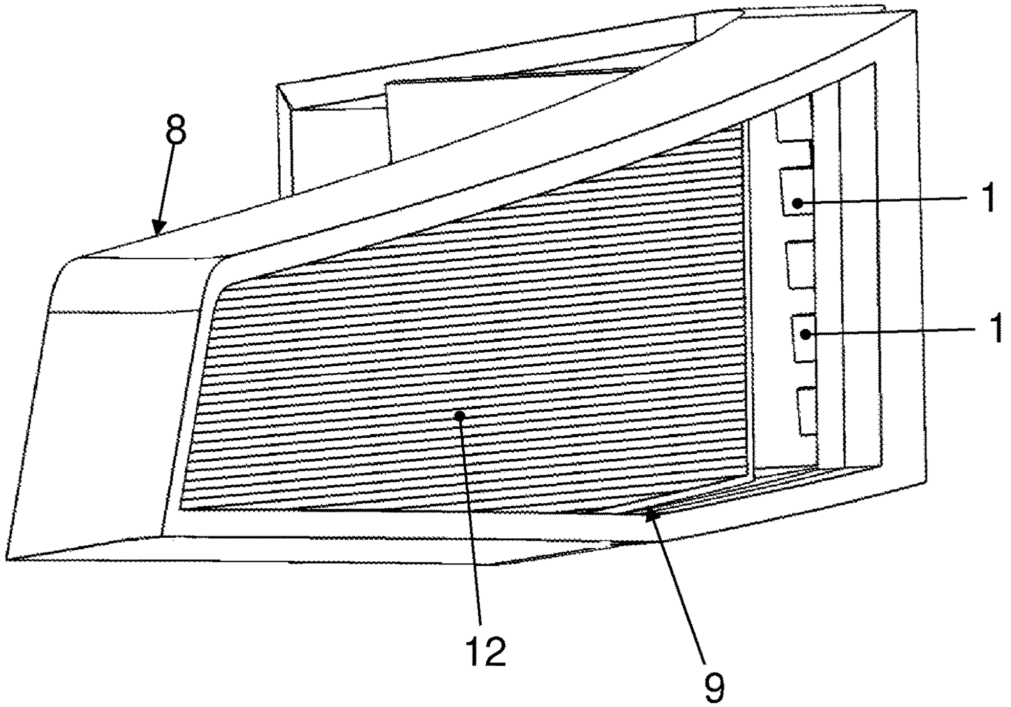
FIG. 6 shows a perspective view of the housing of the lighting device according to FIG. 1.
Figure 7:
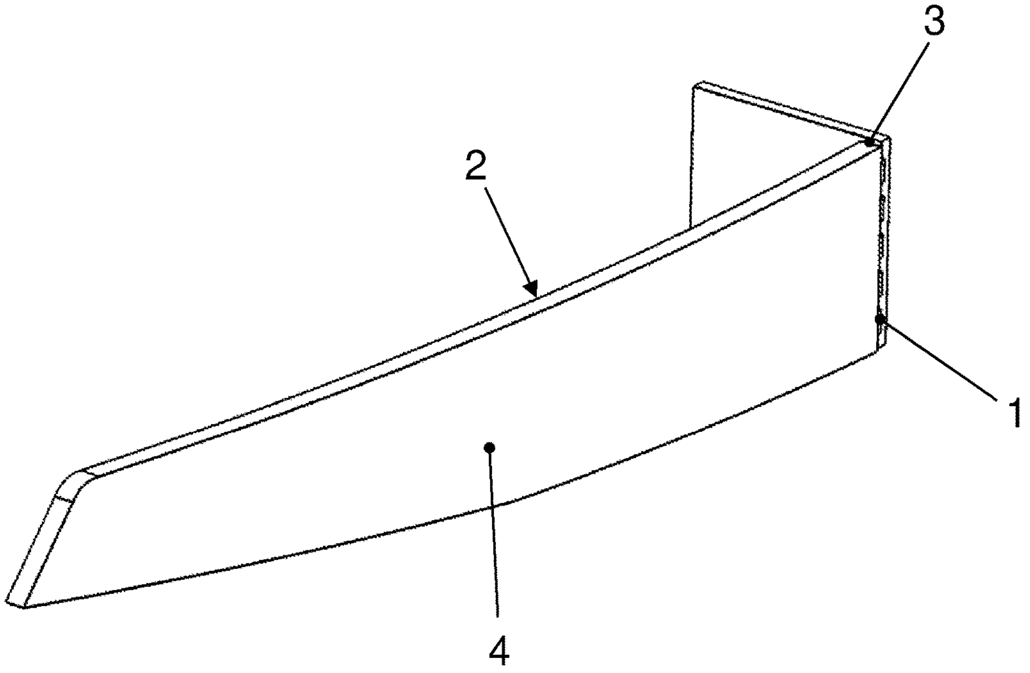
FIG. 7 shows a perspective view of the light guide of the lighting device according to FIG. 1.

The lighting device illustrated in the figures comprises a light source 1 formed as a light-emitting diode (LED), or a plurality of light sources 1 formed as light-emitting diodes (LEDs) (see, for example, FIG. 6 and FIG. 7). The multiple light-emitting diodes can also have different colors, for example, to realize a double function or a triple function. These functions can be, for example, a position light, a daytime running light, and a direction indicator, or a position light, a daytime running light, and an autonomous driving function, wherein the autonomous driving function requires a cyan color.

Figure 1:
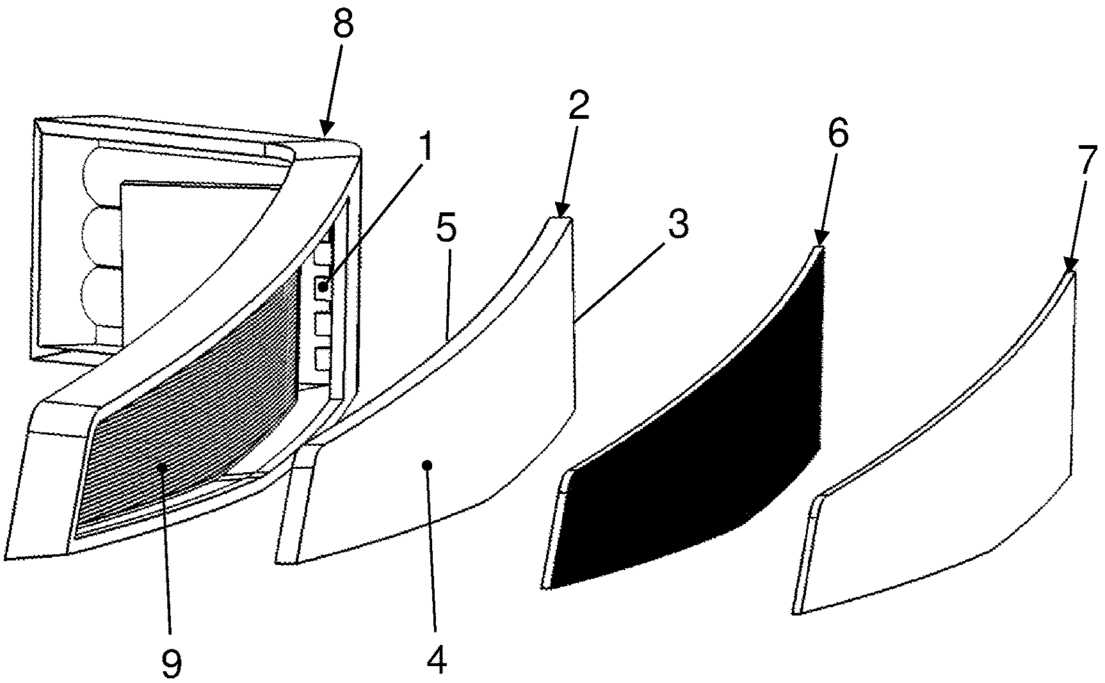
FIG. 1 shows an exploded view of a lighting device of the invention.
Figure 2:
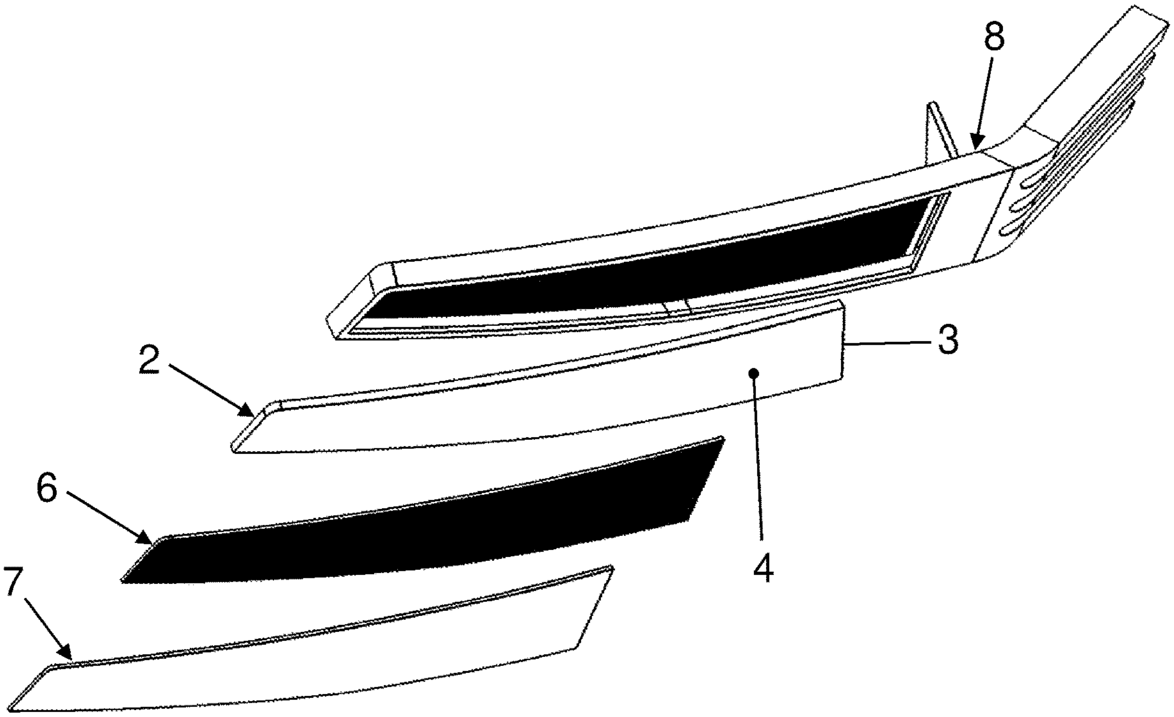
FIG. 2 shows a further exploded view of the lighting device according to FIG. 1.
Figure 8:
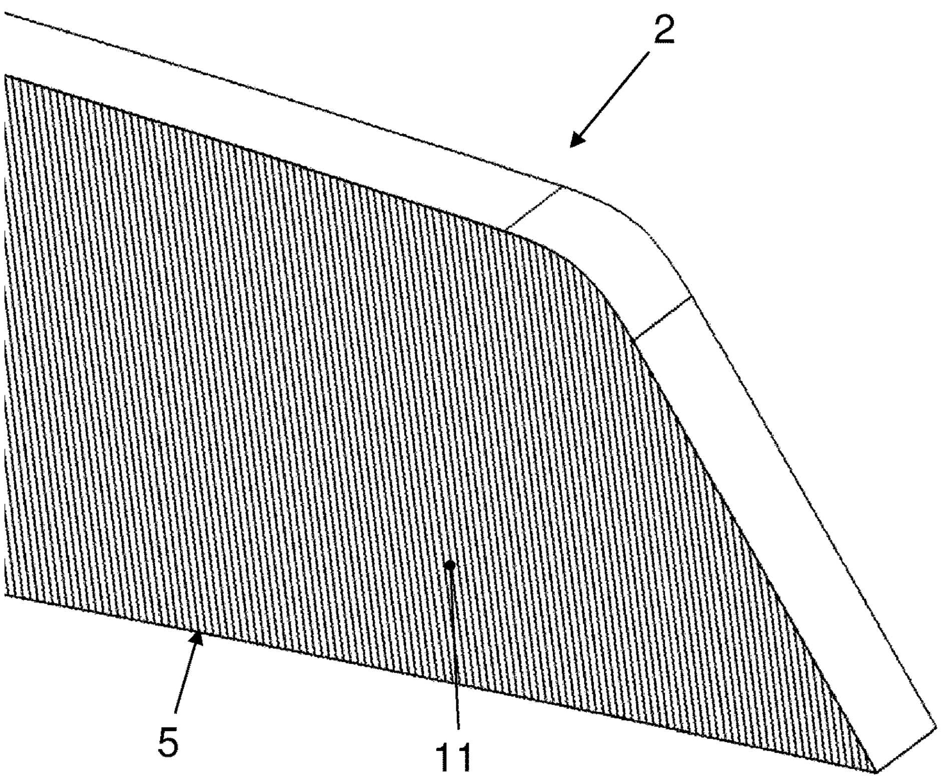
FIG. 8 shows a detail of the light guide of the lighting device according to FIG. 1.

The lighting device further comprises a planar light guide 2 with an input surface 3 and first and second output surfaces 4, 5 (see FIG. 1, FIG. 2, and FIG. 8). Input surface 3 is formed here as the front surface of light guide 2, whereas output surfaces 4, 5 are designed as the front and back of light guide 2.

The lighting device further comprises a first optical panel 6 arranged in front of first output surface 4 of light guide 2, and a second optical panel 7 arranged in front of first optical panel 6. In this regard, second optical panel 7 is optional and can also be omitted.

Figure 5:
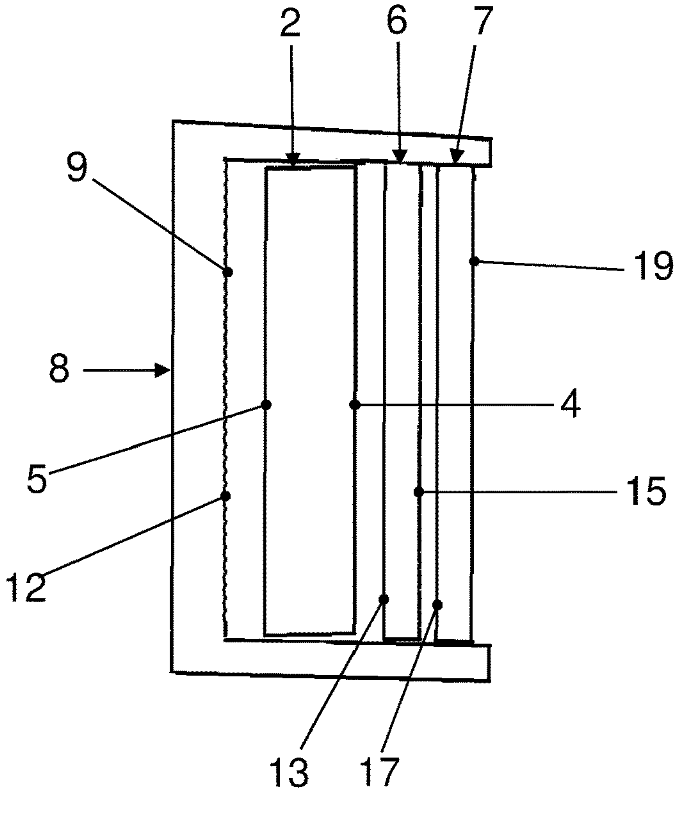
FIG. 5 shows a sectional view through the lighting device according to FIG. 1.

The lighting device further comprises a housing 8 in which the at least one light source 1, light guide 2, and optical panels 6, 7 can be at least partially accommodated (see FIG. 1, FIG. 2, and FIG. 5). Housing 8 has a rear wall 9 which is made at least partially reflective.

Housing 8 can also be designed in two parts for simplified assembly of the optical components and in this regard has a rear and a front housing part. Light guide 2 and optical panels 6, 7 can then be positioned between these housing parts and held and fixed when the two housing parts are joined. The housing parts can be interlocked, screwed from the rear, or welded.

In the area of light guide 2 and optical panels 6, 7, the lighting device is designed as a narrow and flat component which can correspond to flat light modules typical in terms of dimensions. It has an elongated, horizontal orientation with lateral light coupling. It is entirely possible to make the lighting device even more elongated, depending on the desired design.

The lighting device can serve as the sole light module for a signal function or as one part of a multiple arrangement of light modules for a signal function. A number of such light modules, even with partial overlapping, can be jointly placed together to form a signal function. This can be, for example, a daytime running light or a direction indicator or also a combination of both functions, in particular if light sources 1 have a first light-emitting diode with the color "white" and a second light-emitting diode with the color "yellow."

Figure 3:
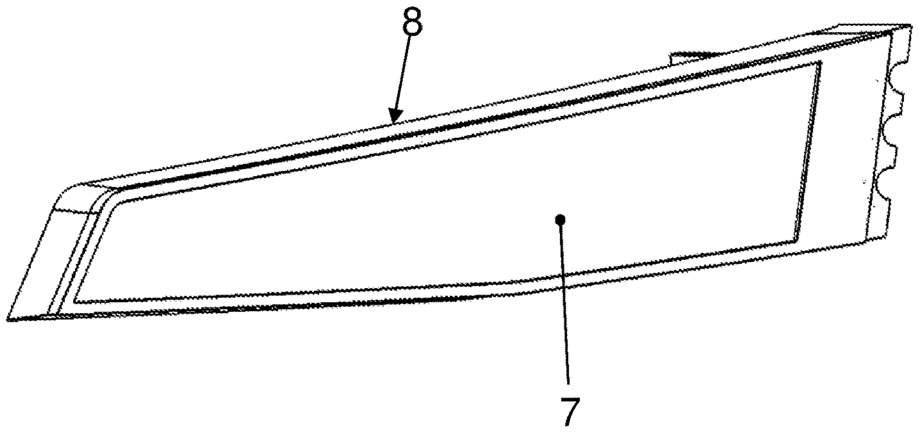
FIG. 3 shows a side view of the lighting device according to FIG. 1.
Figure 4:
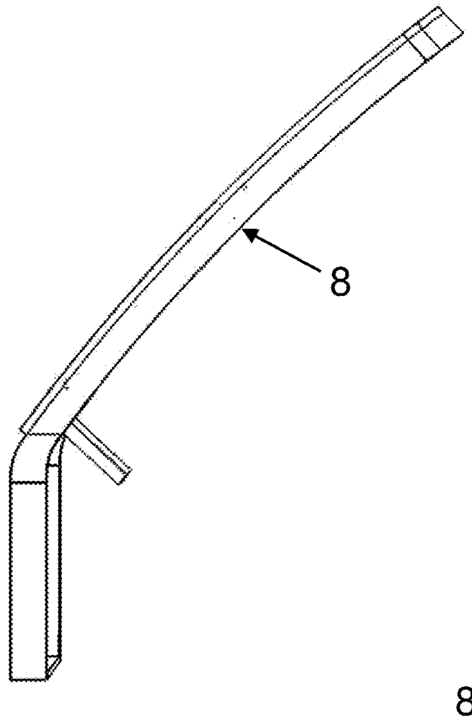
FIG. 4 shows a top view of the lighting device according to FIG. 1.

The lighting device has a curved shape in sections in the area of light guide 2 and optical panel 6, 7 in order to fit into the contour of a headlight or other light in the best possible way and to enable a flat design of the headlight or other light with regard to the overall depth (see FIG. 3 and FIG. 4).

In particular, the optical system of the lighting device can be formed of only a few elements. In addition to light sources 1, these are light guide 2, one or two optical panels 6, 7, and housing 8 with the at least partially reflecting rear wall 9 behind light guide 2.

Light guide 2 can have a texturing 11 on the front, first output surface 4 and on the rear, second output surface 5. In the example shown, only the second output surface 5 has a texturing 11 (see FIG. 8). This texturing 11 has mutually parallel strip-shaped structures that extend perpendicularly to the longitudinal direction of light guide 2 or vertically when installed in the motor vehicle. The strip-shaped structures can be formed cylindrical, wherein the cylinder axes of the structures extend in the longitudinal direction of the strip-shaped structures.

It is entirely possible that light guide 2 only has a texturing on first output surface 4. Furthermore, a first texturing on first output surface 4 and a second texturing on second output surface 5 can also be provided. In this regard, the texturing on both output surfaces 4, 5 can be the same. However, the first texturing can also be different from the second texturing. For example, the strip-shaped structures of the first texturing can be oriented perpendicular to the strip-shaped structures of the second texturing.

Figure 9:
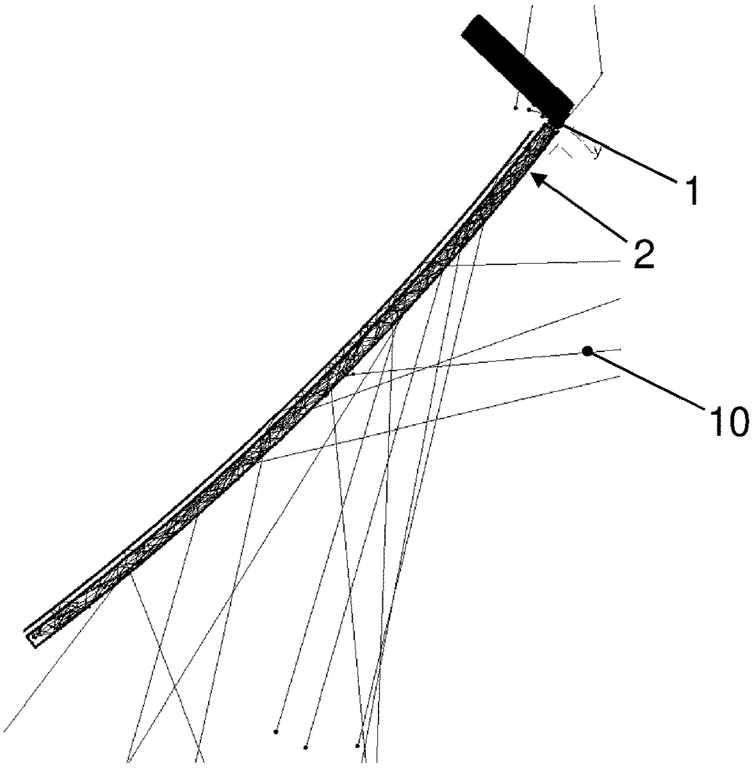
FIG. 9 shows a sectional view through the light guide of the lighting device according to FIG. 1 with an exemplary beam path of the light emerging from a light source.
Figure 10:
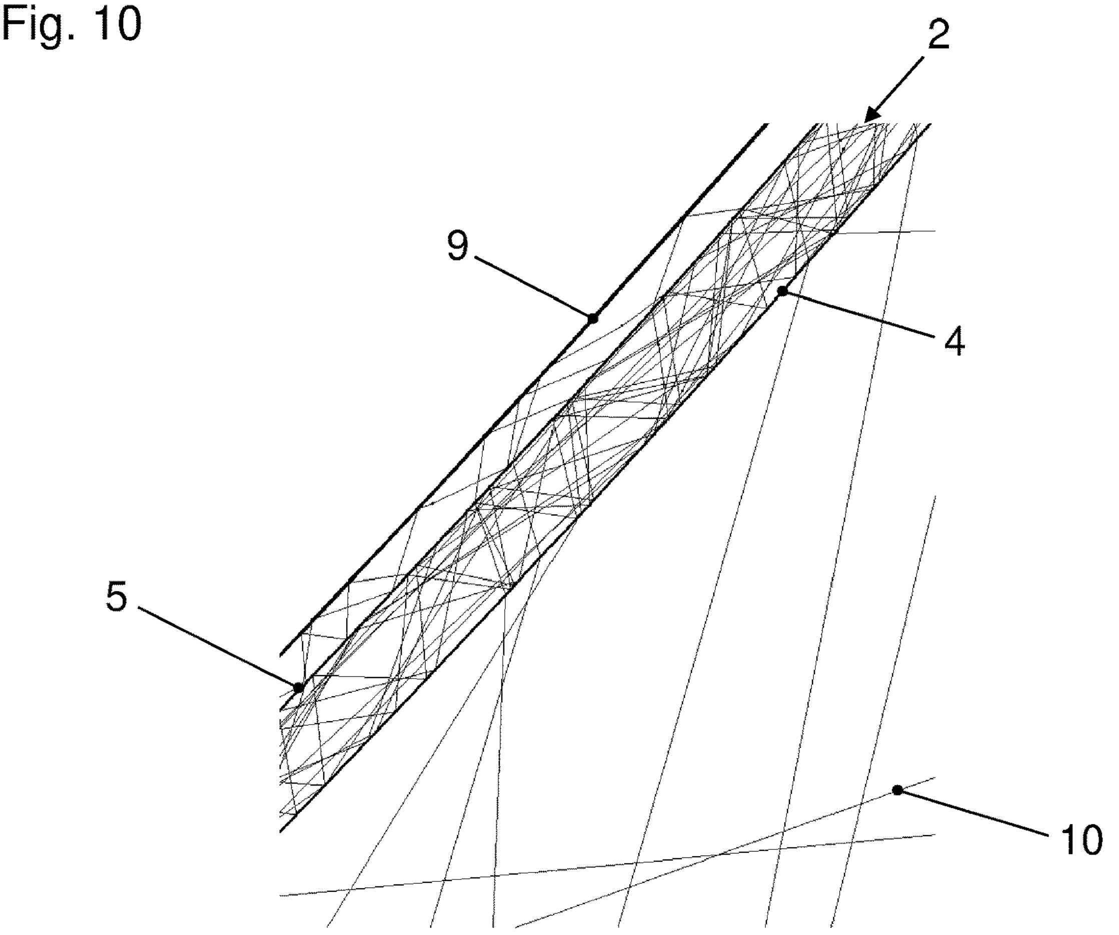
FIG. 10 shows a detail of FIG. 9.
Figure 11:
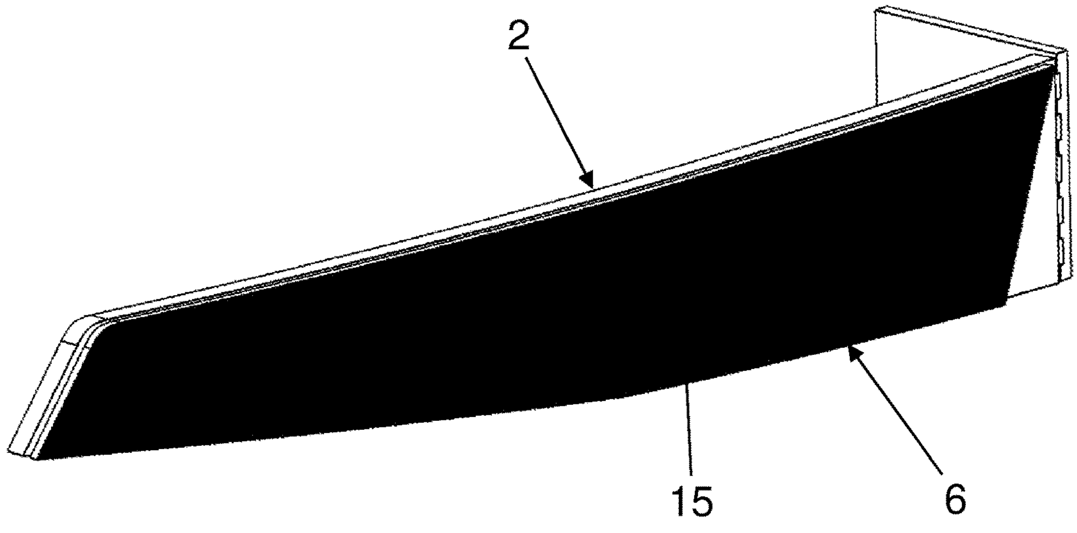
FIG. 11 shows a perspective view of the light guide and the first optical panel of the lighting device according to FIG. 1.
Figure 12:
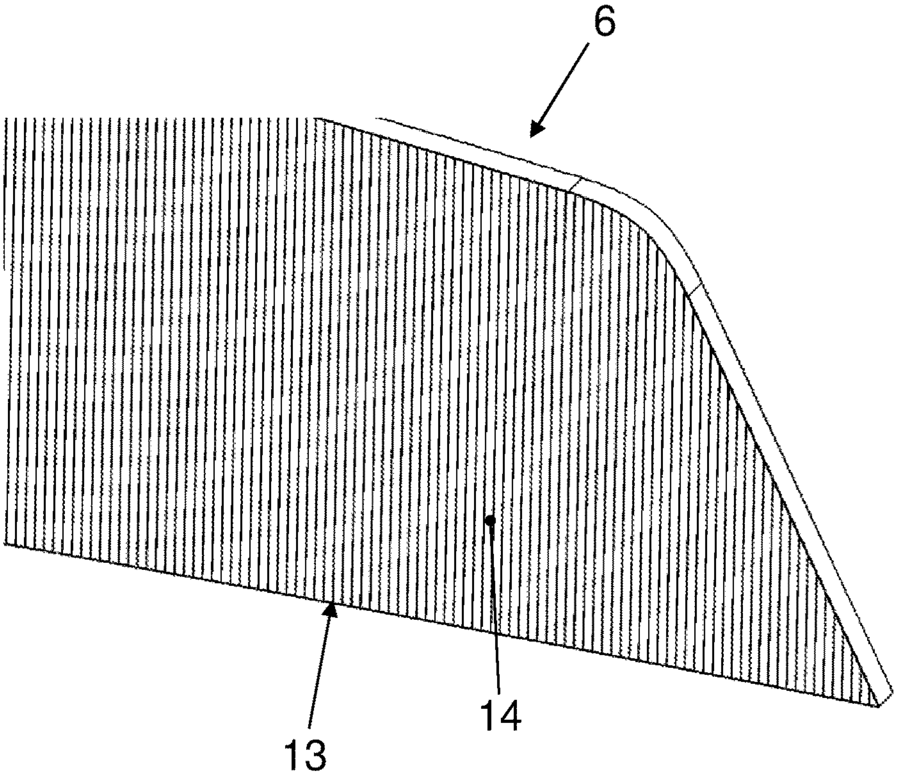
FIG. 12 shows a detail of the first optical panel of the lighting device according to FIG. 1.
Figure 13:
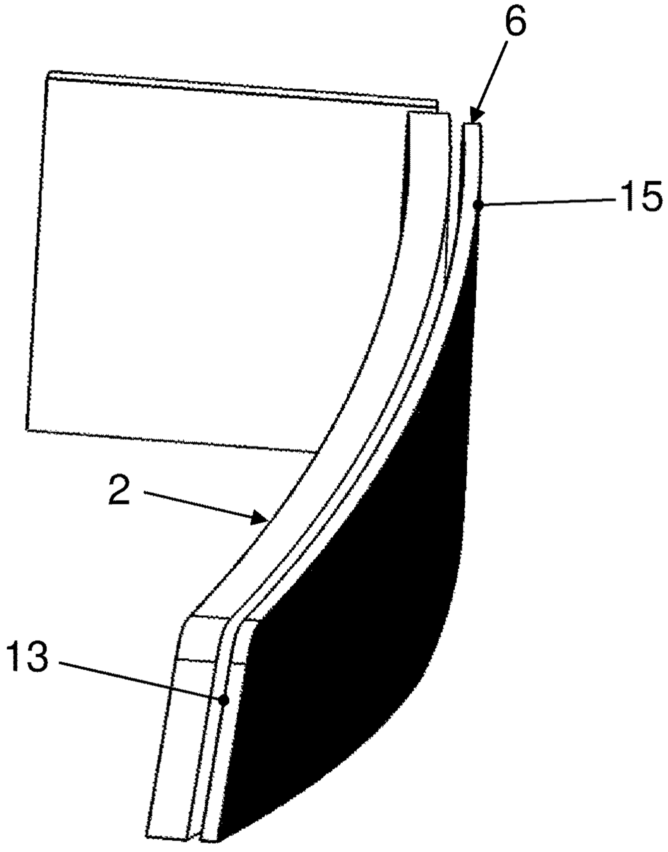
FIG. 13 shows a further perspective view of the light guide and the first optical panel of the lighting device according to FIG. 1.

Light 10 generated by light sources 1 (see FIG. 9 and FIG. 10) enters light guide 2 through input surface 3. Light 10 propagating in light guide 2 is scattered and refracted by texturing 11 formed on second output surface 5. A portion of light 10 exits forward through first output surface 4, passes at least partially through the at least one optical panel 6, 7, and exits the lighting device. It can be used directly for the function of the lighting device.

Another portion of light 10 exits to the rear through second output surface 5. Light 10 emerging backwards through second output surface 5 strikes the at least partially reflective rear wall 9, which is formed, for example, as a vapor-coated mirrored surface. A texturing 12 is formed on rear wall 9 of housing 8. This texturing 12 has strip-shaped structures that extend in the longitudinal direction of light guide 2 or horizontally when installed in the motor vehicle (see FIG. 5 and FIG. 6). The strip-shaped structures can be formed cylindrical, wherein the cylinder axes of the structures extend in the longitudinal direction of the strip-shaped structures.

Light 10 reflected back from rear wall 9 is somewhat bundled and contracted in the vertical direction by texturing 12. The reflected-back light 10 at least partially re-enters light guide 2 through second output surface 5, at least partially exits first output surface 4, and passes through the at least one optical panel 6, 7.

First optical pane 6 has a first texturing 14 on its input surface 13 facing light guide 2 and a second texturing 16 on its output surface 15 facing second optical panel 7. The two texturings 14, 16 are different from one another. Alternatively, the two texturings 14, 16 can be the same.

First texturing 14 on input surface 13 facing light guide 2 has mutually parallel strip-shaped structures that extend perpendicular to the longitudinal direction of light guide 2 or vertically when installed in the motor vehicle. The strip-shaped structures can be formed cylindrical, wherein the cylinder axes of the structures extend in the longitudinal direction of the strip-shaped structures. The cylinder optics of first texturing 14 are used for the additional horizontal scattering and adjusting of the light distribution.

Figure 14:
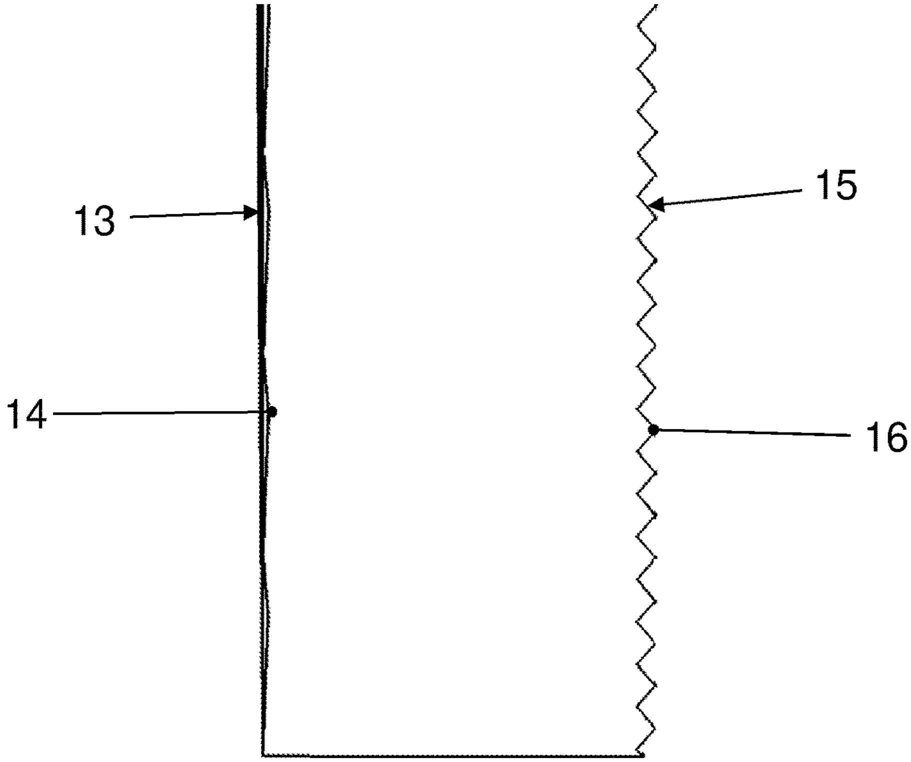
FIG. 14 shows a sectional view through the first optical panel of the lighting device according to FIG. 1.
Figure 15:
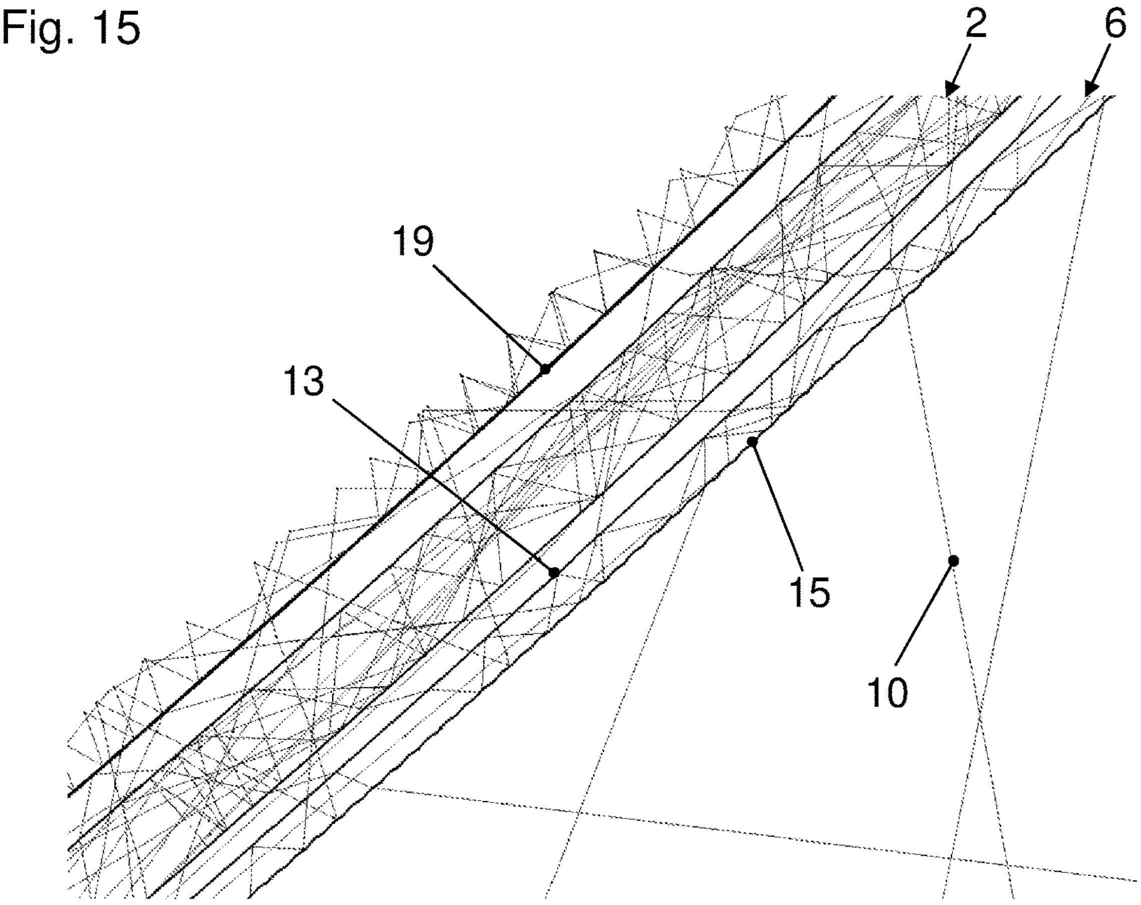
FIG. 15 shows a sectional view through the light guide and the first optical panel of the lighting device according to FIG. 1 with an exemplary beam path of the light emerging from a light source.
Figure 16:
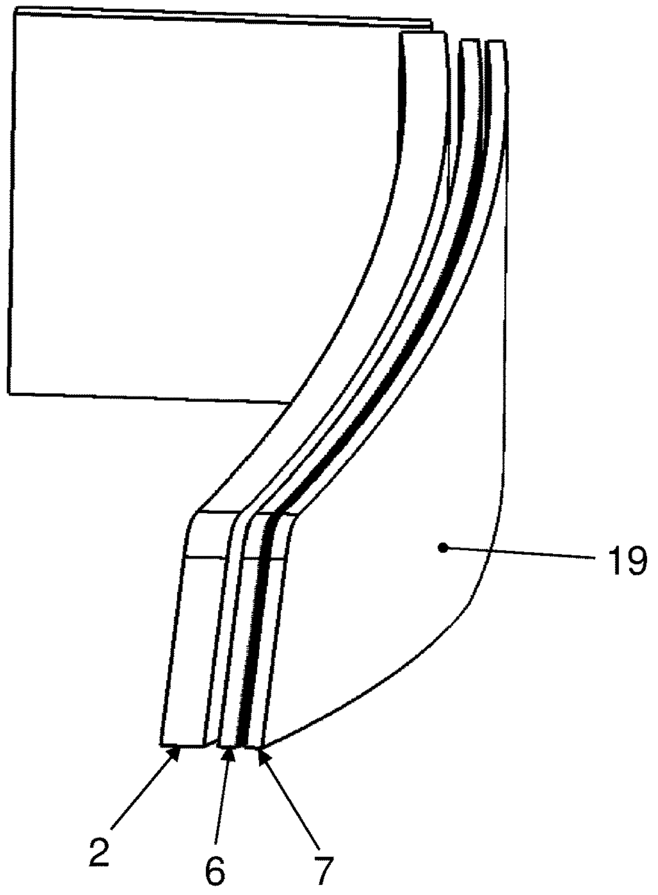
FIG. 16 shows a perspective view of the light guide as well as of the first optical panel and the second optical panel of the lighting device according to FIG. 1.

Second texturing 16 on output surface 15 facing away from light guide 2 has mutually parallel strip-shaped structures that extend horizontally in the longitudinal direction of light guide 2 or when installed in the motor vehicle. The horizontally running strip-shaped structures each have the shape of a prismatic roof (see FIG. 14). The roof prism has a selective effect on light 10 in that certain rays can emerge with a suitable angle of incidence, and focusing or narrowing of the scatter in the vertical direction occurs, whereas steeply incident rays are reflected back by the edges of the roof prism, which extend at an angle of 45°, in the direction of light guide 2 and housing 8. This light 10 travels in the optical system until it has an angle of incidence on the roof prism that allows it to pass through. This increases the efficiency of the system overall.

Figure 17:
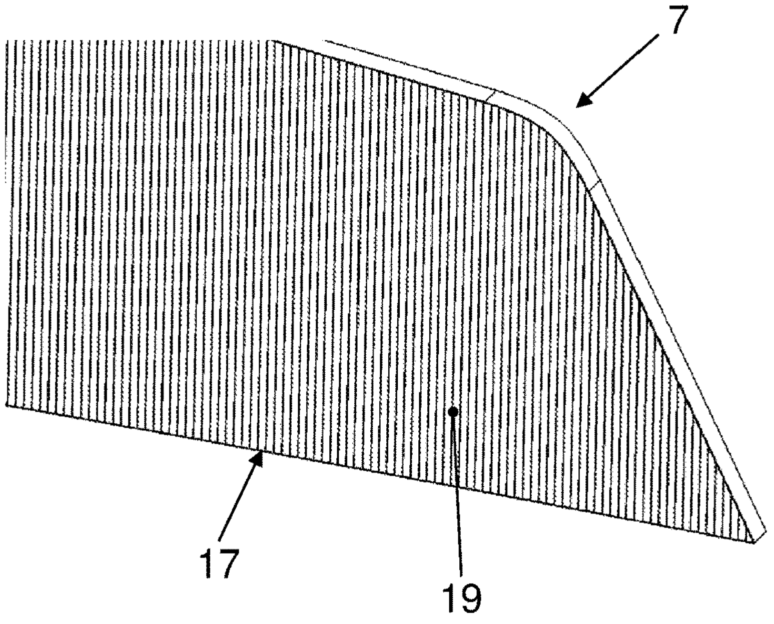
FIG. 17 shows a detail of the second optical panel of the lighting device according to FIG. 1.
Figure 18:
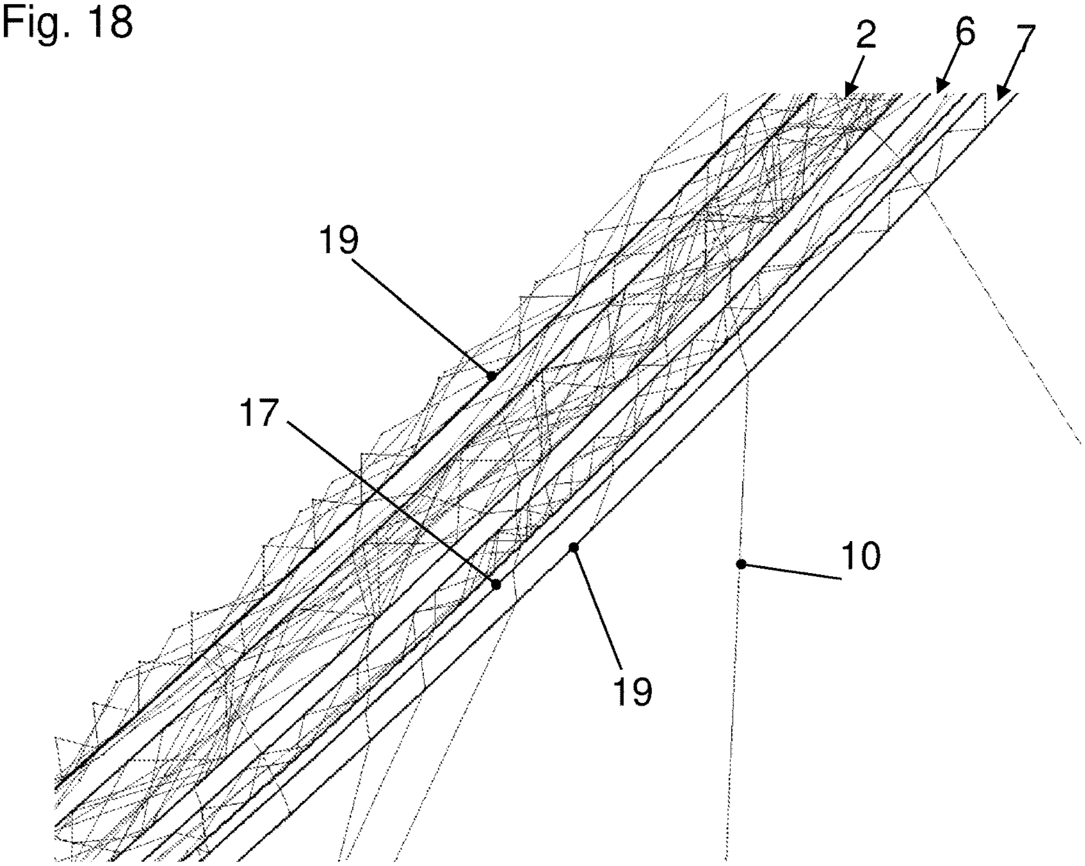
FIG. 18 shows a sectional view through the light guide and through the first optical panel and the second optical panel of the lighting device according to FIG. 1 with an exemplary beam path of the light emerging from a light source.
Figure 19:
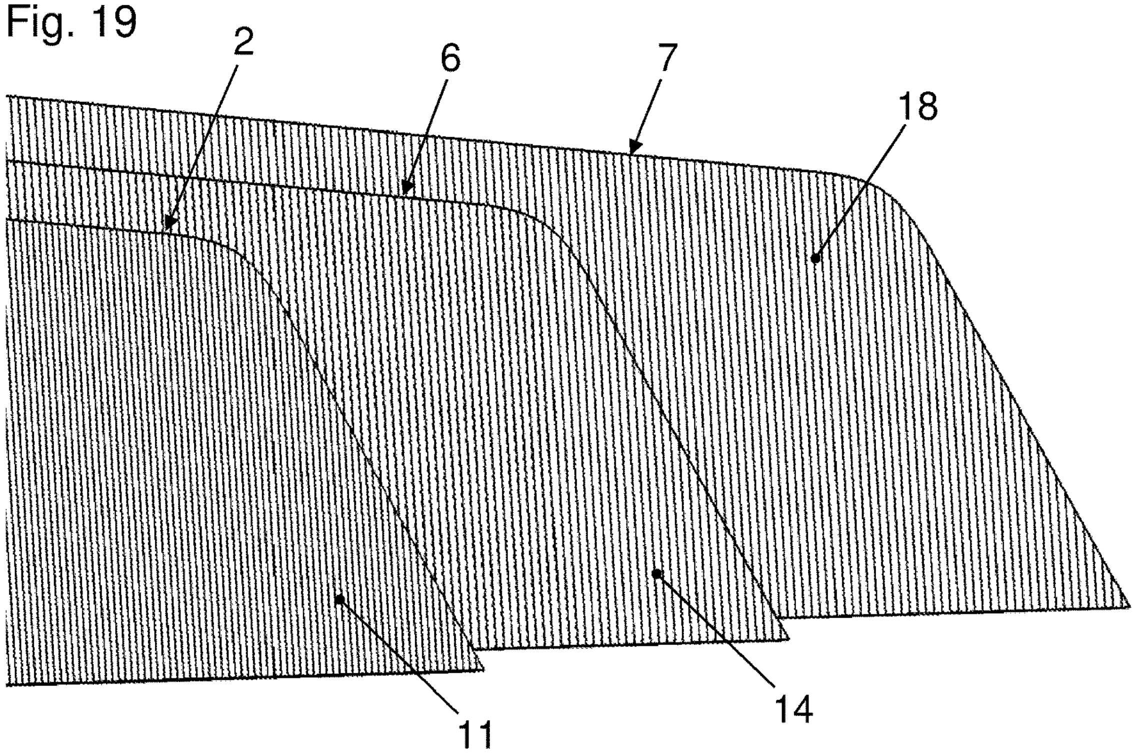
FIG. 19 shows a detail of the light guide, the first optical panel, and the second optical panel of the lighting device according to FIG. 1.

Second optical panel 7 can be used optionally. Second optical panel 7 also has a texturing 18 on its input surface 17 facing the first optical panel (see FIG. 17). This texturing 18 has mutually parallel strip-shaped structures that extend perpendicular to the longitudinal direction of light guide 2 or vertically when installed in the motor vehicle. The strip-shaped structures can be formed cylindrical, wherein the cylinder axes of the structures extend in the longitudinal direction of the strip-shaped structures. Texturing 18 again contributes to the diffusivity and homogenization of the illumination and additionally conceals the view of the prismatic optical strips of the second texturing 16 of first optical panel 6.

In the illustrated exemplary embodiment, there is no texturing on output surface 19 of second optical panel 7, said surface facing away from first optical panel 6. However, it is entirely possible that second optical panel 7 also has a texturing on its output surface 19. As with first optical panel 6, for example, the strip-shaped structures on input surface 17 could be oriented perpendicular to the strip-shaped structures on output surface 19.

The illustrated structure has a texturing with strip-shaped structures on each of the optical components, optical guide 2, optical panels 6, 7, and rear wall 9 of housing 8. However, it is also entirely possible to provide texturing not on all, but only on some or only on one of the components.

In order to obtain an overall flat light module, provision can be made to produce light guide 2 and optical panels 6, 7 as very thin optical components. These components can be made of plastic and be manufactured by an injection molding process. In this regard, the strip-shaped structures can be provided in particular as microstrip optics with very small dimensions in order to advantageously achieve a diffuse appearance of the visible light surface of the lighting device, in which the texturings are generally no longer resolvable as a structure when viewed with the human eye. Thin-walled injection molding of the components, on the one hand, and accurate molding of the strip-shaped structures, on the other, can be achieved with the following dimensions.

The thickness of light guide 2 in the direction perpendicular to output surfaces 4, 5 can be 1 mm to 3 mm, in particular 1 mm to 2 mm. Thereby, the thickness of light guide 2 can change over the longitudinal extent of light guide 2, in particular wherein the thickness of the light guide 2 decreases starting from the input surface 3, for example, from 2.5 mm at the input surface 3 to 1.0 mm at the side of light guide 2, said side being opposite to the input surface 3.

The thickness of optical panels 6, 7 in each case between input surfaces 13, 17 and output surfaces 15, 19 can be less than or equal to 1.5 mm, in particular less than or equal to 1.0 mm.

The strip-shaped structures of texturings 11, 12, 14, 16, 18 can have a center-to-center distance between adjacent structures to one another of between 0.05 mm and 0.5 mm, in particular between 0.05 mm and 0.15 mm.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a motor vehicle, the lighting device comprising:
- at least one light source;
- a planar light guide with an input surface and at least one output surface, the input surface being formed as a front surface of the light guide;
- at least one optical panel, wherein the lighting device is set up so that light generated by the at least one light source enters the light guide at least partially through the input surface and exits at least partially from the at least one output surface, and the light emerging from the at least one output surface passes at least partially through the at least one optical panel; and
- at least one texturing, the at least one texturing having strip-shaped structures substantially parallel to one another,
- wherein the lighting device is set up so that the strip-shaped structures are oriented at least one of horizontally or vertically when installed in the motor vehicle,
- wherein the at least one output surface of the light guide includes a first output surface and a second output surface which are opposite one another, and
- wherein the at least one texturing is formed on the at least one optical panel and on at least one of the first output surface or the second output surface of the light guide.

2. The lighting device according to claim 1, wherein the strip-shaped structures have a center-to-center distance between adjacent structures to one another of between 0.05 mm and 0.5 mm.

3. The lighting device according to claim 1, further comprising a housing in which the light guide and the at least one optical panel are disposed.

4. The lighting device according to claim 3, wherein the housing has an at least partially reflective rear wall that faces the second output surface of the light guide, the second output surface facing away from the at least one optical panel, wherein the lighting device is arranged so that light emerging from the second output surface of the light guide strikes the rear wall and is reflected back by the rear wall to the second output surface and at least partially re-enters the light guide through the second output surface before emerging from the first output surface and passing through the at least one optical panel.

5. The lighting device according to claim 4, wherein the rear wall of the housing has a texturing with strip-shaped structures.

6. The lighting device according to claim 1, wherein the at least one texturing includes a first texturing and a second texturing, wherein the strip-shaped structures of the first texturing are oriented substantially perpendicular to the strip-shaped structures of the second texturing.

7. The lighting device according to claim 1,
- wherein the at least one texturing includes a first texturing and a second texturing, wherein the first texturing with strip-shaped structures is formed on the first output surface of the light guide and the second texturing with strip-shaped structures is formed on the second output surface of the light guide, and wherein the strip-shaped structures on the first output surface are oriented substantially perpendicular to the strip-shaped structures on the second output surface.

8. The lighting device according to claim 1, wherein a thickness of the light guide in a direction substantially perpendicular to the at least one output surface is 1 mm to 3 mm, or 1 mm to 2 mm, or wherein the thickness of the light guide changes over a longitudinal extent of the light guide, or wherein the thickness of the light guide decreases starting from the input surface, from 2.5 mm at the input surface to 1.0 mm at a side of the light guide opposite to the input surface.

9. The lighting device according to claim 1, wherein the at least one optical panel has an input surface and an output surface opposite to the input surface for the light emerging from the light guide.

10. The lighting device according to claim 9, wherein the at least one texturing includes a texturing with strip-shaped structures formed on the input surface of the at least one optical panel or wherein the at least one texturing includes a texturing with strip-shaped structures formed on the output surface of the at least one optical panel or wherein the at least one texturing includes a texturing with strip-shaped structures formed on the input surface of the at least one optical panel and a texturing with strip-shaped structures formed on the output surface of the at least one optical panel with the strip-shaped structures on the input surface being oriented substantially perpendicular to the strip-shaped structures on the output surface.

11. The lighting device according to claim 1, wherein the at least one optical panel comprises a first optical panel and a second optical panel arranged in the lighting device so that, during operation of the lighting device, the light emerging from the at least one output surface of the light guide passes at least partially sequentially through the first optical panel and the second optical panel.

12. The lighting device according to claim 11, wherein both the first optical panel and the second optical panel have the at least one texturing with strip-shaped structures on at least one of an input surface thereof or an output surface thereof.

13. The lighting device according to claim 1, wherein a thickness of the at least one optical panel between an input surface and an output surface thereof is less than or equal to 1.5 mm.

* * * * *